United States Patent [19]

Pacala

[11] Patent Number: 4,698,518
[45] Date of Patent: Oct. 6, 1987

[54] MAGNETICALLY SWITCHED POWER SUPPLY SYSTEM FOR LASERS

[75] Inventor: Thomas J. Pacala, LaCanada, Calif.

[73] Assignee: The United States of America as represented by the Administrator of the National Aeronautics and Space Administration, Washington, D.C.

[21] Appl. No.: 13,803

[22] Filed: Feb. 12, 1987

Related U.S. Application Data

[63] Continuation of Ser. No. 727,931, Apr. 29, 1985, abandoned.

[51] Int. Cl.⁴ .................................................. H01S 3/00
[52] U.S. Cl. ..................................... 307/106; 328/67; 315/172; 315/173
[58] Field of Search ............... 307/106, 108, 246, 268, 307/412, 415, 416, 417, 418, 419; 328/65, 67, 59, 60, 61, 62, 63; 372/81, 82; 315/172, 173, 174, 175, 241 R

[56] References Cited

U.S. PATENT DOCUMENTS

| | | | |
|---|---|---|---|
| 2,863,126 | 12/1958 | Pierce | 307/106 X |
| 2,919,414 | 12/1959 | Neitzert | 307/106 X |
| 3,474,290 | 10/1969 | Swain | 315/175 X |
| 3,614,653 | 10/1971 | Javan | 372/82 |
| 3,780,342 | 12/1973 | Grimshaw et al. | 315/173 |
| 4,003,007 | 1/1977 | Stewart | 307/106 X |
| 4,071,806 | 1/1978 | List | 372/81 X |
| 4,139,805 | 2/1979 | Cosco et al. | 315/241 R |
| 4,275,317 | 6/1981 | Laudenslager et al. | 307/415 |
| 4,417,180 | 11/1983 | Chamran et al. | 315/175 |
| 4,469,981 | 9/1984 | Ruff et al. | 315/173 X |
| 4,549,091 | 10/1985 | Fahlen et al. | 307/106 |
| 4,591,761 | 5/1986 | Gregorich et al. | 315/173 X |
| 4,612,643 | 9/1986 | Long et al. | 315/173 X |
| 4,648,093 | 3/1987 | Sasnett et al. | 372/82 X |

FOREIGN PATENT DOCUMENTS 56-12789 2/1981 Japan .................................. 372/81

Primary Examiner—Bentsu Ro
Attorney, Agent, or Firm—Paul F. McCaul; John R. Manning; Thomas H. Jones

[57] ABSTRACT

A laser power supply system is described in which separate pulses are utilized to avalanche ionize the gas within the laser and then produce a sustained discharge to cause the gas to emit light energy. A pulsed voltage source is used to charge a storage device such as a distributed capacitance. A transmission line or other suitable electrical conductor connects the storage device to the laser. A saturable inductor switch is coupled in the transmission line for containing the energy within the storage device until the voltage level across the storage device reaches a predetermined level, which level is less than that required to avalanche ionize the gas. An avalanche ionization pulse-generating circuit is coupled to the laser for generating a high-voltage pulse of sufficient amplitude to avalanche ionize the laser gas. Once the laser gas is avalanche ionized, the energy within the storage device is discharged through the saturable inductor switch into the laser to provide the sustained discharge. The avalanche ionization generating circuit may include a separate voltage source which is connected across the laser or may be in the form of a voltage multiplier circuit connected between the storage device and the laser. A tapered transmission conductor means such as a tapered parallel plate transmission line may be caused to couple one or more saturable inductor switches of one size to a laser of a different size.

19 Claims, 12 Drawing Figures

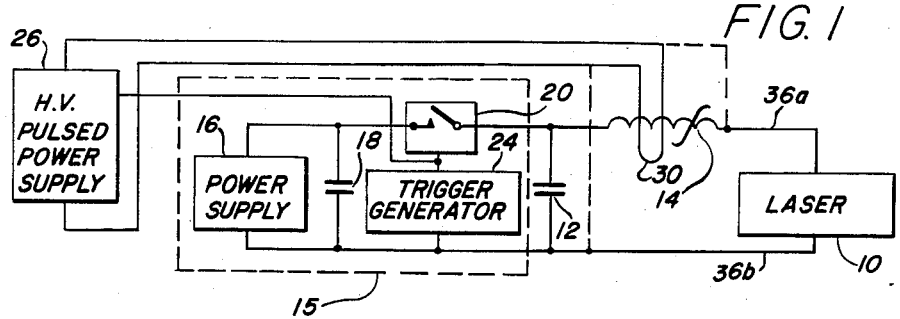
FIG. 1
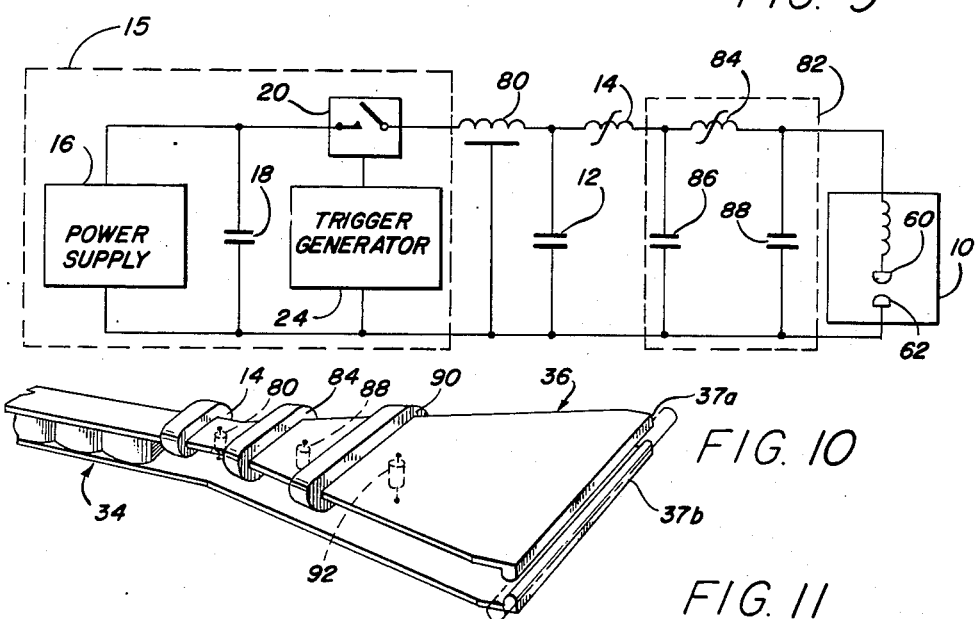
FIG. 9
FIG. 10
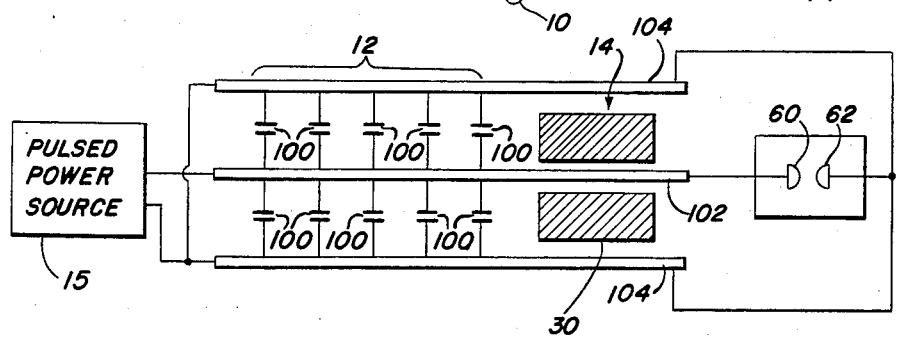
FIG. 11

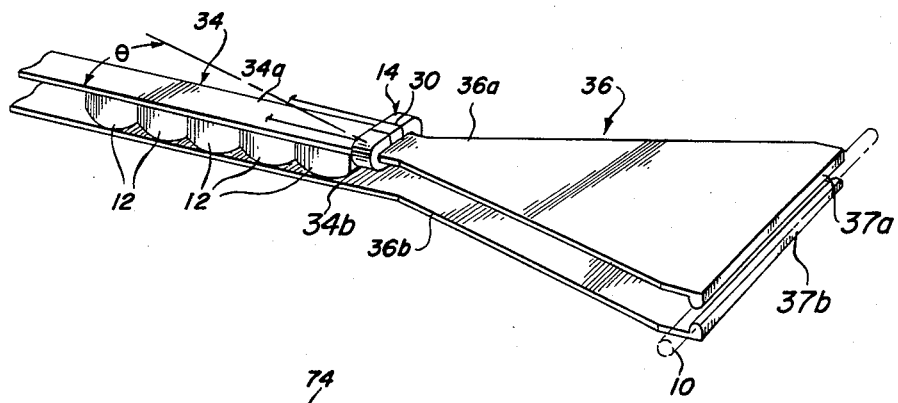
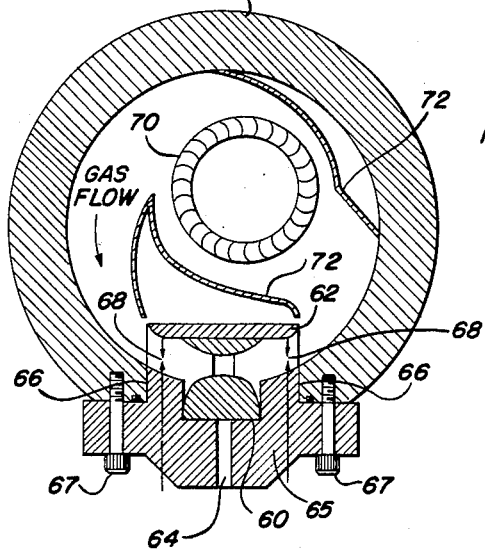
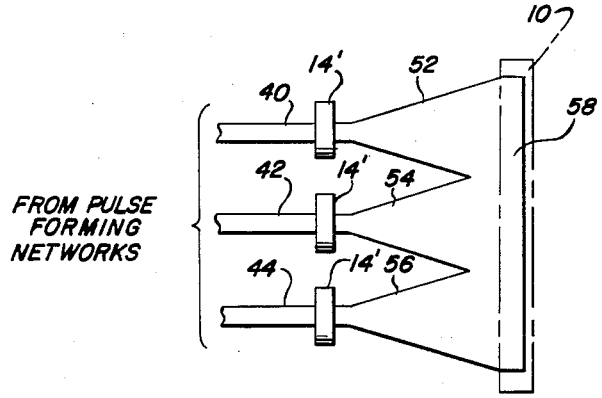

MAGNETICALLY SWITCHED POWER SUPPLY SYSTEM FOR LASERS

ORIGIN OF THE INVENTION

The invention described herein was made in the performance of work under a NASA Contract and is subject to the provisions of Section 305 of the National Aeronautics and Space Act of 1958, Public Law 85-568 (72 STAT 435; 42 USC 2457).

This application is a file wrapper continuation of application Ser. No. 727,931, filed Apr. 29, 1985, now abandoned.

BACKGROUND OF THE INVENTION

1. Field of the Invention

This invention relates to power supply systems for providing periodic excitation of electric discharge gas lasers.

2. Background of the Invention

High power electric discharge gas lasers such as xenon chloride, mercury bromide and carbon dioxide lasers can be operated to provide high pulsed output energy. To produce such energy the gas within the laser must be excited (pumped) by means of an intense source of (pulsed) electron excitation, either from a high voltage, self-sustained electric discharge or an electron beam sustained discharge. The excitation of the gas or gases within the laser results in the emission of light energy of the appropriate wavelength (e.g., ultraviolet, visible or infrared), which light energy can then be collimated, as is well known in the art. Due to certain practical limitations of the electron beam method of exciting the laser gases, the self-sustained electric discharge method is becoming the more popular alternative.

To provide a self-sustained electric discharge in an electric discharge gas laser (EDGL), one must first preionize the gas (low-level ionization), then avalanche the low-level ionization (avalanche ionize) to the final level appropriate for pumping the gas laser, and finally excite the gas by sufficient energy to provide the sustained discharge. Typically, the gas has been preionized by the use of low-energy ultraviolet radiation or X-rays.

In the past, single high voltage pulses having fast rise times of the order of 10's-100's nanoseconds (ns) and discharge pumping pulse durations of the order of 10's-100's ns or more have been used to avalanche ionize the gas and then to provide the required sustained discharge.

Plasma rail and magnetic switches have been used to provide such high energy, rapid rise time and long duration pulses. However, magnetic switches using self-saturating inductors (reactors) have advantages over plasma rail switches such as long life, reliability, low cost, less complexity and high repetitive rate capability. U.S. Pat. No. 4,275,317 teaches the use of saturable inductors as switches for compressing the width and sharpening the rise time of pulses from high-voltage, high-impedance pulse generators to provide the necessary excitation to EDGLs. Such saturable inductors, in conjunction with capacitance storage devices, compress the pulses from the high voltage generator until the voltage buildup (and current) reaches a level sufficient to saturate the inductor, thereby reducing its impedance to a very low value and coupling the pulses to the laser. A plurality of saturable inductor switches may be used in series to successively compress the pulse and decrease its rise time, as is discussed in the above patent.

The prior art systems using such saturable inductors for providing the electrical energy to avalanche ionize and subsequently provide a sustained discharge for lasers, while having many advantages over systems using plasma rail-type switches, still suffer from several deficiencies. First, the amplitude of the voltage pulse required to avalanche ionize the laser gas to the proper ionization level, which may be of the order of 15 to 20 kilovolts (kv), is many times greater than the amplitude of the pulse (e.g., 2–3 kv) required to provide a sustained discharge after the gas has been avalanche ionized. Also, the energy of the avalanche ionization pulse need be only a fraction of the discharge energy required for the sustained discharge pulse. When a single pulse is used to accomplish both functions, the energy level of the entire pulse must be high, thereby reducing efficiency. The impedance of the avalanche ionization pulse source will necessarily be too high for the laser during the sustained discharge. Furthermore, the output saturable inductor switch will be required to switch more power than it would if a separate low-energy, high-voltage pulse was utilized to avalanche ionize the laser gas.

In addition to the inefficiencies inherent in the use of a single pulse to provide the avalanche ionization and sustained discharge of the laser, the magnetically switched prior art power supply systems for lasers have allowed the length of the laser discharge electrodes to dictate the size of the core for the output saturable inductor switch which transfers the pulse to the laser.

The output saturable inductor switch for driving lasers of the transverse discharge type is conventionally incorporated in a transmission line geometry of the parallel plate type, as is illustrated in FIGS. 6, 7 and 8 of the above patent. Such a geometry dictates the use of a rectangular (or racetrack-shaped) core with an opening having a width slightly larger than the width of the transmission line. In most applications the required width of the core, as determined from the performance specifications for the saturable inductor, is not equal to the length of the laser electrodes. As a result, the core width is either too large or too small, thereby resulting in an excessive power loss within the core or improper switching. For example, an article entitled "Magnetic Modulators for Low-Impedance Discharge Lasers" by E. Y. Chu, G. Hoffman, H. Kent and T. Beinhardt published in the IEEE Conference Record 1982, 15th Power Modulator Symposium, pp. 37–46, describes the use of an inductor core having a width of one meter for switching a pulsed power source to a one-meter-long mercury-bromide laser. A parallel plate transmission line of approximately one meter in width was used to carry the pulses from the switch to the laser electrode. The use of a smaller core for the inductor switch would have significantly increased the overall efficiency of the laser power supply system.

The present invention solves the above problems by providing separate avalanche ionization and sustained discharge pulses and a transmission line for coupling a saturable inductor core of one size to laser electrodes of another size.

SUMMARY OF THE INVENTION

In accordance with the present invention, a laser power supply system is provided in which a high-voltage pulse is initially used to avalanche ionize the gas and then a second high energy pulse is used to produce a sustained discharge. The system includes a source of voltage which is periodically connected across a first or primary capacitance energy storage device (e.g., a bank of capacitors and/or a transmission line) to charge the storage device to a predetermined voltage level which is less than the voltage necessary to avalanche ionize the laser gases but greater than that necessary to maintain a sustained discharge. Conductor means such as a transmission line joins the storage device and the laser. An output saturable inductor switch is coupled to the conductor means and arranged to contain the energy within the storage device until the voltage level across the storage device reaches a predetermined level.

An avalanche ionization pulse generator is coupled to the transmission line or the output switch for supplying an avalanche ionization pulse to the laser having a voltage level sufficient to ionize the gas therein in synchronism with the voltage across the storage device reaching the predetermined level, whereby the energy from the storage device is discharged through the saturable inductor switch and the laser to provide a sustained discharge.

The avalanche ionization pulse generator may be independent from the storage device and coupled directly across the laser electrodes or to the laser electrodes through an auxiliary winding on the core of the output switch. The pulse generator may also comprise additional saturable inductor switches and capacitors (if needed) coupled to the conductor means between the laser and the output switch for utilizing a portion of the energy stored in the storage device to form a fast rise time, high-voltage avalanche ionization pulse. The conductor means located between the output switch and the laser may also be in the form of a parallel plate transmission line and tapered to geometrically match the core of the output switch to a laser of a different size, or may simply be in the form of multiple connectors to provide uniform voltage and current distribution to the laser electrodes.

BRIEF DESCRIPTION OF THE DRAWINGS

FIG. 1 is a schematic circuit diagram of a power supply system in which two separate pulse sources are utilized to provide the avalanche ionization and sustained discharged pulses for an EDGL in accordance with the invention;

FIG. 3 is a schematic representation of a portion of the power supply system of FIG. 1 in which a tapered parallel plate transmission line is utilized for coupling a saturable inductor switch core of one size to laser electrodes of a larger size;

FIG. 5 is a plan view of another embodiment of the invention in which three separate output saturable inductor switches, along with three sections of tapered transmission line, are utilized to apply the excitation voltages to a laser in accordance with this invention;

FIG. 8 is a cross-sectional view of an EDGL with transverse electrodes which may be connected to the power supply system of this invention;

FIG. 9 is a schematic circuit diagram of another embodiment of the invention in which the avalanche ionization and sustained discharge pulses are derived from a common energy source;

FIG. 10 is a schematic representation of a portion of the power supply system of FIG. 9 in which a parallel plate tapered transmission line is used to couple the output saturable inductor switch to the laser;

FIG. 11 is a schematic circuit diagram of another embodiment of the invention in which a parallel plate transmission line in the form of an inner high voltage plate and two outer ground plates is connected between the pulse source and the laser.

DETAILED DESCRIPTION OF THE DRAWINGS

Figure 2:
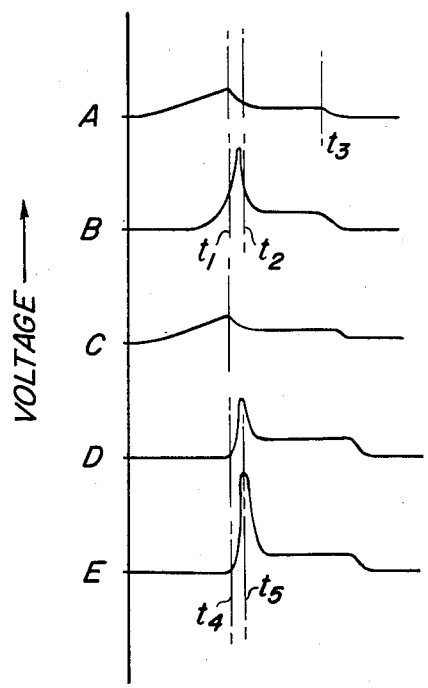
FIG. 2 is a waveform representation of the pulses present at several points in the circuit of FIGS. 1 and 6.

Referring now to FIG. 1, an electric discharge gas laser (EDGL) 10 is connected to a first or primary capacitance energy storage device 12 (sometimes referred to hereinafter as a capacitor) through an output saturable inductor switch 14 of the type described in U.S. Pat. No. 4,275,317. The capacitor 12 is preferably in the form of multiple capacitors or distributed capacitance in order to obtain a desired pulse shape, as described in the above patent. The capacitor 12 is periodically charged from a pulsed high-voltage source 15, which includes a power supply 16, a parallel-connected capacitor 18, a starting switch 20 and a trigger generator 24. The generator 24 periodically opens and closes the switch 20 at the proper repetition rate (e.g., 250 Hz) to provide the desired pulsed output from the laser 10. The pulsed source 15 may include additional pulse-forming elements (e.g., inductors and capacitors, if desired), and the power supply may be any form of suitable pulse generator such as a Marx, LC inversion generator or conventional transformer-type generator.

The output switch 14 in its unsaturated state presents a very high impedance to current flow from the capacitor 12 to the laser 10. When the voltage across the capacitor 12 (and the resultant current through the switch) reaches a predetermined level, the switch saturates and presents a very low impedance to current flow from the capacitor 12 through the laser 10. The high voltage pulse power supply 15 is designed to charge the capacitor 12 to a voltage level which is less than that necessary to avalanche ionize the gases within the laser, but greater (e.g., twice) than the voltage level necessary to provide a sustained discharge within the laser.

A high voltage pulsed power supply 26 is coupled to the output inductor switch 14 by means of a winding 30 to provide avalanche ionization pulses. The trigger generator 24 is also coupled to the high voltage pulsed power supply 26 to synchronize the discharge pulses from the supply 26 with the charge buildup on the capacitor 12 so that voltage on that capacitor will approach but not equal the predetermined level necessary to saturate the output switch 14 at the time the avalanche ionization pulse reaches its peak value.

The saturable inductor's core (shown at 30 in FIG. 3) prior to saturation acts as a good pulse transformer, thereby coupling the pulse from the source 26 to the laser. The peak voltage of the avalanche ionization pulse is sufficient to avalanche ionize the gases within the laser. As a result of the avalanche ionization of the gases, the impedance across the laser electrodes drops from the order of megohms to ohms or fractions of an ohm. At this time the voltage across the capacitor 12 reaches the predetermined level, thereby saturating the output switch 14 and causing the capacitor 12 to discharge through the laser. The discharge from the capacitor 12 provides a sustained voltage discharge and excitation of the laser. The avalanche ionization pulses which may be of the same or opposite polarity as the main discharge pulse may be applied directly to the laser electrodes via the conductor means (leads 36a, 36b) which couple the sustained discharge pulses to the laser, as is illustrated by the dashed line in FIG. 1. The polarity of the avalanche ionization pulses will determine whether there will be current or voltage reversal in the laser or the saturable inductor.

Referring now to FIG. 2, waveform A is representative of the voltage pulse across the capacitor 12, and waveform B is representative of the avalanche ionization voltage pulse impressed across the laser by the source 26, winding 30 and transformer 14 in the circuit of FIG. 1. As is illustrated in FIG. 2, the pulse B (which has a very fast rise time $<0.2$ $\mu$sec) is coupled to the saturable inductor core (30 in FIG. 3) at time $t_1$ prior to saturation of the core. At this time, the core acts as a conventional pulse transformer and couples the ionization pulse to the laser. The voltage pulse A will cause saturation of the inductor switch 14 after the pulse B has avalanche ionized the laser gas. Saturation of the output inductor switch core reduces the impedance of the switch to a very low level and allows the energy stored in capacitor 12 to discharge through the laser. Voltage pulse A after time $t_2$ represents the sustained discharge pulse as applied to the laser 10. The time duration ($t_1$ to $t_2$) of the avalanche ionization pulse is very short compared to the sustained discharge pulse ($t_2$ to $t_3$), which may last for 100+ ns. The waveforms C, D and E of FIG. 2 represent pulses generated in another embodiment (FIG. 9) of the power supply system of this invention and will be discussed later.

The system of FIG. 1 provides many advantages over prior art systems which utilize a single pulse to perform the functions of avalanche ionizing the gas and causing the sustained discharge. For example, the use of two pulses permits the impedance of the sustained discharge pulse source (including capacitor 12) to be matched to the impedance of the laser load after ionization, thereby improving efficiency and saving power. Also, the voltage rating of the capacitor 12 and the size of the output switch 14 can be reduced. Further, since the sustained discharge pulse is not utilized to avalanche ionize the laser gases, the rise time of such pulse may be slower than the rise time of the avalanche ionization pulses, thereby providing a savings in the cost of the pulsed source 15.

Conductor means in the form of a parallel plate transmission line for connecting the laser 10 to the output switch 14 and the capacitor 12 is illustrated in FIG. 3. A first section 34 connects the capacitor 12 (in the form of multiple capacitors as shown) and the switch 14. A second section 36 is connected between the end of the first section (near the switch 14) and the laser 10, as shown. It should be noted that the sections 34 and 36 need not meet at the output switch, but may be joined on either side of the output switch. The first section 34 of the transmission line includes a top plate 34a arranged to carry the high voltage and a bottom ground plate 34b. The capacitor 12 is illustrated as being in the form of discrete capacitors connected between the plates 34a and 34b. The section of the transmission line extending between the capacitors 12a–12e provides inductance so that the capacitor 12 is in the form of a distributed capacitance as described in U.S. Pat. No. 4,275,317.

The second section 36 of the transmission line includes a top high voltage plate 36a and a bottom ground plate 36b. The free ends of the plates 36a and 36b terminate in elongated contact members 37a and 37b, respectively. The contact members 37a and 37b are adapted to engage the discharge electrodes of the laser. The saturable inductor output switch 14 includes a core 30 as shown in FIG. 3. The minimum dimensions for the core 30 are dictated by certain parameters of the laser (e.g., voltage and current requirements), the final stage of the pulse-forming network (e.g., the distributed capacitance 12a–12e), and the material properties of the core (Metglass ® and Mylar ®, as discussed in U.S. Pat. No. 4,275,317, or ferrite). Metglass is a trademark of Allied Chemical Corporation for an amorphous metal mixture, and Mylar is a DuPont Corp. trademark for a well-known plastic film (insulating) material. Ferrites are nonlinear magnetic materials.

The inductor switch 14 is usually comprised of only one or two turns of the transmission line around the core to keep the saturated inductance at a minimum. Multiple cores, each having single or multiple turns, can also be used to provide the required cross-sectional core area. The dimensions of the inductor core 30, and particularly the width or length divided by two, will normally be smaller than the length of the transverse electrodes of small- to medium-size lasers. For example, a Xenon chloride (XeCl) laser with discharge dimensions of 0.9 cm high, 0.7 cm wide and 42 cm long operated at a pulse repetition rate of 250 Hz from a five-section final PFN (i.e. capacitor 12) with a total capacitance of 80 nf which required an output switch having a core 10 cm wide and 4 cm$^2$ in cross-section. The second section 36 of the transmission line was therefore tapered from about 10 cm in width to 42 cm to provide the proper interface between the output switch and the laser electrodes. The tapered transmission line section 36 provided a constant impedance which matched the impedance of the straight transmission line section 34.

Figure 4:
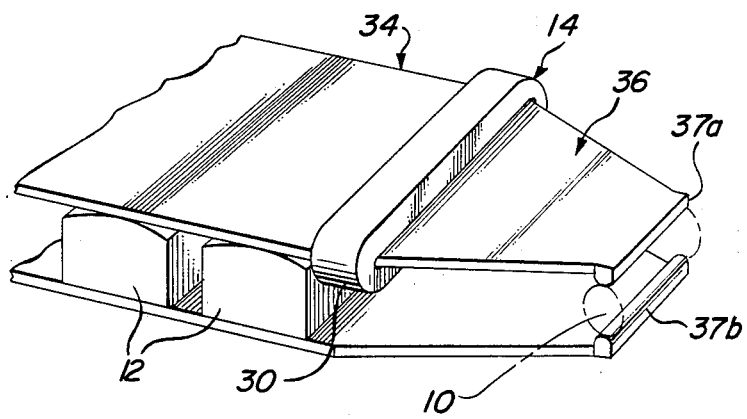
FIG. 4 is a schematic representation of a portion of the power supply system of FIG. 1 in which a tapered parallel plate transmission line is utilized for coupling a saturable inductor switch core to laser electrodes of a smaller size.

The tapered section 36 can also be used to match an output switch core having a large width to a laser having a shorter length, as is illustrated in FIG. 4 where like elements are given the same identification number. For example, a very large laser, one having discharge dimensions of $20 \times 20 \times 100$ cm$^2$, would require an output switch with a core width much longer than the laser. The included angle $\theta$ of the taper, as illustrated in FIG. 3, will be dependent upon space considerations, the value of the capacitance between the plates 36a and 36b, and the need to ensure that the pulse wavefront (essentially arcuate in shape) arrives at the laser electrodes at substantially the same time. A large angle $\theta$ may cause the wavefront to arrive at different times, while a small angle $\theta$ may result in an excessive capacitance value between the plates of the tapered transmission line and an excessive amount of energy stored in the capacitance between the plates with diminished overall efficiency.

The total capacitance between the plates of the second section 36 of the transmission line can be reduced substantially by the use of a parallel network of tapered sections and output switches, as is illustrated in FIG. 5. In this embodiment three parallel output saturable inductor switches 14' are coupled to three separate pulse-forming networks via three straight transmission line sections 40, 42 and 44 for providing sustained discharge pulses. Each pulse-forming network may comprise the elements 15, 12 and 20 of FIG. 1 and a single trigger generator 24 coupled to the three starting switches 20 for synchronization purposes. A common source of ionization pulses (e.g., element 26 of FIG. 1) may be coupled to each core of the switches 14' by suitable windings. Three tapered line sections 52, 54 and 56 extend from respective straight sections 46–50 to a common end section 58 which is coupled to the transverse electrodes of the laser 10. The shorter transition sections 52–56 (with their lower capacitance) reduce the system energy requirements where the optimum core width of the output switch is considerably smaller than the length of the laser electrodes.

Figure 6:
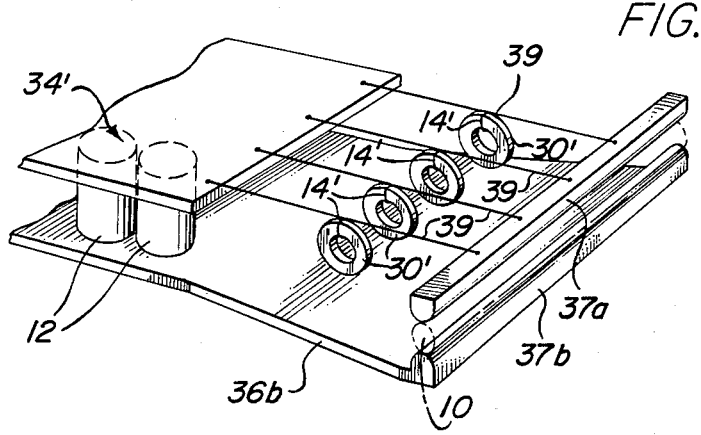
FIG. 6 is a schematic representation of an alternative embodiment of the present invention in which a plurality of individual conductors are employed to couple the energy from a primary storage device through multiple output-saturable inductor switches to the laser electrodes.
Figure 7:
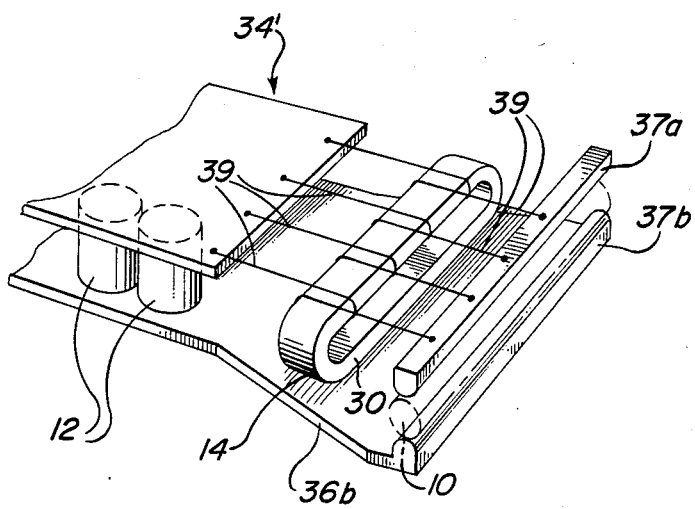
FIG. 7 is a schematic representation of another embodiment of the present invention in which a plurality of individual conductors are employed to couple the energy from a primary storage device through a single saturable switch to the laser electrodes.

FIGS. 6 and 7 illustrate the use of multiple connectors 39 (conductor means) for coupling the energy from the storage means 12 and conductor or transmission line section 34' to the laser 10. As is shown in FIG. 6, multiple output-saturable inductor switches 14' are used to switch the energy from the capacitor 12 into the laser load. Individual conductors 39 are wound around the cores 30' of respective inductor switches 14' in the embodiment of FIG. 6. In FIG. 7, multiple connectors or conductors 39 are wound around a single core 30 of the switch 14 and connected to the section 34' at one end and to elongated contact members 37a and 37b.

Referring now to FIG. 8, there is shown a cross-sectional view of the laser 10 depicting the transverse discharge electrodes 60 and 62 which extend substantially the entire length of the laser. Electrode 60 functions as the high voltage electrode and is arranged to be coupled to the high voltage contact member 37a of the circuit of FIG. 3 by means of high voltage feed-throughs 64 which extend through an insulating support member 65. The ground electrode 62 is arranged to be connected to the transmission line ground plate contact member 37b by means of conductor 66 and bolts 67. Auxiliary electrodes 68 disposed at the sides of the transverse electrodes may be connected to a suitable ac source (not shown) to provide ultraviolet radiation to preionize the gases between the electrodes 60 and 62. A fan 70 and flowguides 72 cause the gases to circulate within the laser envelop 74.

Referring now to FIG. 9, there is illustrated another embodiment of a power supply system for providing avalanche ionization and sustained discharge pulses to a laser in which the energy for both pulses is derived from a common capacitance energy storage device 12. The dc power supply 16, capacitor 18, trigger generator 24 and starting switch 20 are used as in the circuit of FIG. 1 to periodically charge the capacitance storage device or capacitor 12 through a pulse-forming network (PFN) 80. While a separate PFN is not illustrated as a part of the pulsed power supply 15 in FIG. 1, it is to be understood that such a network may be included if needed to provide the proper rise time and compression of the pulses which charge the capacitor 12, as is well known in the art.

A voltage-peaking section 82 is connected in the transmission line between the output-saturable inductor switch 14 and the laser 10. The voltage-peaking section comprises an additional saturable inductor switch 84 and a pair of capacitance energy storage devices (capacitors) 86 and 88 connected as shown. The capacitance of the storage device 86 (e.g., ~20 nf) is about one order of magnitude less than the capacitance of the storage device 12 (e.g. ~200 f) and about one order of magnitude greater than the capacitance of the storage device 88 (e.g., ~2–4 nf). The output inductor switch 14 and capacitor 86 function as a first voltage doubler, and the inductor switch 84 and capacitor 88 function as a second voltage doubler. The output switch 14 is arranged to switch from a high to a low impedance when the voltage across the capacitor device 12 reaches a predetermined level (e.g., ~5 kv), which level is below the level required to ionize the laser gas (e.g., ~16 kv). When the voltage across capacitor 12 reaches the predetermined level, the output switch 14 saturates and provides a low impedance permitting current to flow through the switch and charge capacitor 86. Due to the inductance of the switch 14, current continues to flow until the voltage across capacitor 86 reaches a level approximately twice the predetermined level. At this time the inductor switch 84 saturates, transferring charge from capacitor 86 to capacitor 88 until the voltage across capacitor 88 reaches a level (e.g., ~16 kv) sufficient to avalanche ionize the gases within the laser 10. The output switch 14 remains saturated during the time interval required for the voltage-peaking section to produce the avalanche ionization pulse.

When the laser gases are avalanche ionized, the impedance across the laser electrodes drops to a very low value, permitting the charge on capacitor 12 to discharge through the laser via switches 14 and 84, thereby causing a sustained discharge.

Referring now to FIG. 2, the voltage waveforms of the pulses on capacitors 12, 86 and 88 are represented by graphs C, D and E, respectively. As is illustrated at time $t_4$, the output switch 14 saturates and capacitor 86 commences to charge up. Subsequently, switch 84 saturates, allowing some of the energy stored in capacitor 86 to charge up capacitor 88, and at time $t_5$ the voltage (waveform C) across capacitor 88 reaches the level necessary to produce avalanche ionization. The rise time of the pulses C, D and E may be of the order of 200, 20 and 5 ns, respectively. It is to be understood that the maximum voltage level of the output pulse from the voltage peaking section 82 will fully avalanche ionize the laser gases, and rise times of the pulses C, D and E will be dependent upon the values of the circuit components. Further voltage multiplier sections may be added to the voltage peaking section 82 as desired. For example, n voltage multiplier sections can be inserted between the output switch 14 and the laser electrodes where n is an integer, with each section comprising an energy device such as capacitor 86 and a saturable switch such as switch 84.

FIG. 10 is a perspective view of the power supply system of FIG. 9 without the pulsed source 15 and PFN 80, but including an additional voltage multiplier section comprising a third saturable indicator switch 90 and capacitor 92. The additional voltage multiplier section permits the use of a lower level sustained discharge voltage pulse (maximum voltage on capacitor 12).

FIG. 11 illustrates the use of a three parallel plate transmission line for connecting the pulsed source 15 (of FIG. 1) to the laser load 10. The capacitance storage device 12 is made of a plurality of lumped capacitors 100 connected between the high voltage plate 102 and the outside ground plates 104. The ground plates 104 are connected to electrode 62, and the high voltage plate is connected to the plate 62 as shown.

Figure 12:
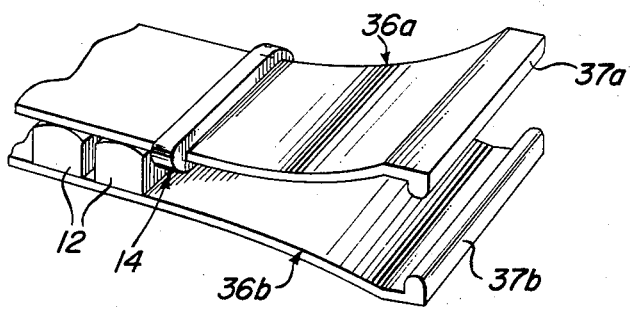
FIG. 12 is a schematic representation of another embodiment of the invention in which a parallel plate transmission line having an exponential taper is used to couple the energy from the primary storage device to the laser electrodes.

FIG. 12 illustrates an exponentially tapered transmission line for coupling the energy from the primary storage capacitor 12 to the laser. Such a transmission line results in an impedance variation causing the circuit to ring and the voltage pulse to increase in amplitude as it travels down the transmission line. The extra pulse caused by ringing will avalanche ionize the laser gas to the final level necessary for pumping and lower the impedance across the laser to a very low level as discussed previously. The capacitor 12 will discharge into the laser and provide the sustained discharge.

There has been described a laser power supply system which efficiently produces and applies the electrical energy necessary to fire electric discharge gas lasers. Various modifications to the system will be obvious to those skilled in the art without departing from the spirit and scope of the invention. For example, the capacitor 12 may be replaced with a transmission line element PFN of variable or constant impedance. Separate avalanche ionization and sustained discharge pulses may be applied to a laser with coaxial as well as parallel plate transmission lines. A parallel plate transmission line need not have a tapered section. Further, the use of a tapered section for geometrically matching an output switch core of one size to laser electrodes of another size is not dependent upon the use of separate pulses for providing the avalanche ionization and substained discharge.

What is claimed is:

1. In a power supply system for providing energy necessary to avalanche ionize gas and subsequently the energy necessary to provide a sustained discharge of the gas after ionization thereof in an electric discharge gas laser having discharge electrodes in which a voltage necessary to avalanche ionize the gas exceeds a sustained discharge voltage, the combination which comprises:
   (a) a source of electrical energy;
   (b) a first energy storage device;
   (c) means connected between the electrical energy source and the first energy storage device for periodically charging the first energy storage device;
   (d) conductor means connected between the first energy storage device and the discharge electrodes of the laser;
   (e) output saturable inductor switch means coupled to the conductor means and providing a high impedance to current flow through the conductor means when voltage across the first energy storage device is less than a predetermined level and a low impedance to current flow through the conductor means when the voltage across the first energy storage device reaches said predetermined level, the predetermined level being less than the avalanche ionization voltage and greater than the sustained discharge voltage; and
   (f) avalanche ionization pulse-generating means coupled to said conductor means for supplying an avalanche ionization pulse to the discharge electrodes of the laser having a voltage sufficient to avalanche ionize the gas therein and in synchronism with the voltage level across the storage device reaching said predetermined level, whereby the energy from the storage device will be discharged through the laser to provide a sustained discharge.

2. The system as defined in claim 1 wherein the avalanche ionization pulse-generating means is coupled to the conductor means for impressing the avalanche ionization pulse directly across the discharge electrodes of the laser.

3. The system as defined in claim 1 wherein the output saturable inductor switch means includes a magnetic core and the avalanche ionization pulse-generating means includes a winding on said core and a high voltage pulse source connected to said winding.

4. The system as defined in claim 1 wherein the avalanche ionization pulse-generating means includes at least a second energy storage device coupled to the conductor means between the output saturable inductor switch means and the discharge electrodes of the laser for impressing a voltage at least equal to the avalanche ionization voltage across the discharge electrodes when the impedance of the output saturable inductor switch means is low.

5. The system as defined in claim 4 wherein a second saturable inductor switch is connected between the second energy storage device and the discharge electrodes of the laser and arranged to provide a high impedance until the voltage across the second energy storage device reaches a level at least equal to the avalanche ionization voltage.

6. The system as defined in claim 1 wherein the avalanche ionization pulse-generating means includes n voltage multiplier stages coupled between the output saturable inductor switch means and the discharge electrodes of the laser where n is an integer, each voltage multiplier stage comprising a saturable inductor switch and an electrical energy storage device coupled to the conductor means, the switches and storage devices being arranged to increase the peak voltage at each stage so that the peak voltage across the discharge electrodes is at least equal to the avalanche ionization voltage.

7. The system as defined in claim 5 including a third energy storage device connected between the second saturable inductor switch and the laser discharge electrodes.

8. The system as defined in claim 1 wherein the conductor means is a transmission line.

9. The system as defined in claim 1 wherein the conductor means comprises a plurality of individual conductors.

10. The system as defined in claim 9 wherein the output saturable inductor switch means comprises a separate saturable inductor switch coupled to each conductor.

11. The system as defined in claim 2 wherein the laser is of a transverse electrode type and the transmission line comprises two sections of parallel plates joined together with the second section being connected to the discharge electrode of the laser, the length of the discharge electrode being different than the maximum width of the first section, the second section being tapered from a width substantially equal to the maximum width of the first section to a width approximately equal to the length of the laser electrodes.

12. The system as defined in claim 11 wherein the second section of the transmission line provides an impedance variation to cause the voltage pulse from the first energy storage device to increase in amplitude as it travels toward the laser discharge electrodes.

13. The system as defined in claim 1 wherein the laser is of a transverse electrode type and wherein the output saturable inductor switch means comprises a plurality of saturable inductor output switches and the conductor means comprises a first and a second parallel plate transmission line associated with each output switch, one end of the first and the second parallel plate transmission lines being joined together adjacent the respective saturable inductor output switch with each output switch extending around one plate of the first respective transmission line, the other end of the first transmission line being connected to the first energy storage device, each second transmission line tapering outwardly from said one end and means joining the other ends of the second transmission lines adjacent the discharge electrodes whereby the avalanche ionization pulses transmitted by each output switch are applied simultaneously to substantially separate portions of the laser.

14. In a magnetically switched pulse-forming system for providing excitation current from a pulsed voltage source to an electric discharge gas laser to avalanche ionize and excite the gas therein, the laser having a pair of transverse discharge electrodes, the combination which comprises:
   (a) a pulse-forming network including a first energy storage device and a first parallel plate transmission line having a first and a second end with the first end connected to the pulsed voltage source;
   (b) A second parallel plate transmission line having a first and a second end with the first end thereof connected to the second end of the first transmission line and the second end thereof coupled to the laser traverse discharge electrodes for coupling energy from the pulse-forming network to the laser, the second transmission line having a taper with the width at one end thereof substantially matching the width of the first transmission line and at the other end substantially matching the length of the laser electrodes; and
   (c) an output saturable inductor switch coupled in the first transmission line for controlling the transfer of pulses from the pulsed voltage source to the laser traverse discharge electrodes.

15. The system as defined in claim 14 wherein the output saturable inductor switch has a magnetic core with an elongated opening therein through which one plate of the first transmission line extends.

16. The system as defined in claim 15 wherein the width of the elongated opening in the core of the output saturable inductor switch is smaller than the length of the laser electrode.

17. The system as defined in claim 15 wherein the width of the elongated opening in the core of the output saturable inductor switch is larger than the length of the laser electrodes.

18. In a magnetically switched pulse-forming system for providing excitation current from a pulsed source to an EDGL to avalanche ionize and excite the gas therein, the laser having a pair of transverse electrodes, the combination which comprises:
   (a) a plurality of pulse-forming networks, each network including a first parallel plate transmission line having first and second ends, the first end of each said transmission line being connected to the pulsed source;
   (b) a plurality of second parallel plate transmission lines, each second transmission line being associated with a respective first transmission line having a first and a second end the first end of each second transmission line being connected to the second end of a respective first transmission line and the second end of each second transmission line being coupled to the laser electrodes so that each second transmission line is coupled to a substantially separate portion of the electrodes; and
   (c) an output saturable inductor switch coupled in each first transmission line for controlling the transfer of pulses from the pulsed source to the laser electrode.

19. The method of providing excitation energy to an electric discharge gas laser having a pair of discharge electrodes comprising:
   (a) periodically charging a primary storage device to a predetermined voltage level which is lower than that necessary to avalanche ionize the gas within the laser and higher than that necessary to produce a sustained discharge of the gas;
   (b) periodically applying avalanche ionizing pulses directly to the laser discharge electrodes which have a voltage level sufficient to avalanche ionize the gas within the laser in synchronization with the voltage across the primary storage device reaching said predetermined level;
   (c) connecting the primary storage device across the laser discharge electrodes with a magnetic switch in a saturable state when the voltage across the primary storage device reaches said predetermined level to produce a sustained discharge; and
   (d) disconnecting the primary storage device from the laser discharge electrodes through the same magnetic switch in a non-saturable state at the termination of the sustained discharge.

* * * * *